United States Patent [19]

Sakata et al.

[11] Patent Number: 5,018,028
[45] Date of Patent: May 21, 1991

[54] AUDIO SIGNAL RECORDING APPARATUS AND REPRODUCING APPARATUS

[75] Inventors: Tsuguhide Sakata; Norio Kimura, both of Tokyo; Masahiro Takei, Kanagawa, all of Japan

[73] Assignee: Canon Kabushiki Kaisha, Tokyo, Japan

[21] Appl. No.: 594,681

[22] Filed: Oct. 9, 1990

Related U.S. Application Data

[63] Continuation of Ser. No. 449,082, Dec. 8, 1989, abandoned, which is a continuation of Ser. No. 944,672, Dec. 19, 1986.

[30] Foreign Application Priority Data

Dec. 27, 1985 [JP] Japan ................................. 60-297224

[51] Int. Cl.⁵ ............................ G11B 5/02; H04N 5/60
[52] U.S. Cl. ......................................... 360/27; 369/59
[58] Field of Search ............................ 360/27; 369/59

[56] References Cited

U.S. PATENT DOCUMENTS

| | | | |
|---|---|---|---|
| 2,999,909 | 9/1961 | Knight | 369/86 |
| 4,388,654 | 6/1983 | Mehrotra | 369/86 |
| 4,399,329 | 8/1983 | Wharton | 369/49 |
| 4,564,867 | 1/1986 | Nakajima | 360/27 |
| 4,677,606 | 6/1987 | Ogatz et al. | 369/59 |

FOREIGN PATENT DOCUMENTS 3129920 3/1982 Fed. Rep. of Germany .
2050677 1/1981 United Kingdom .

OTHER PUBLICATIONS

"De-B Schule fur Rundfunkrechnik, Handbuch fur Tonstudiotechnik, 2 Aufl., Munchen, N.Y. 1978, Verlag Dokumentation Saur KG", pp. 154–155.

Primary Examiner—Vincent P. Canney
Attorney, Agent, or Firm—Robin, Blecker, Daley & Driscoll

[57] ABSTRACT

A recording apparatus of a type which records signals in an L+R voice track and an L−R voice track on a recording medium is designed to record, in the L−R voice track, an additional discriminating signal for inhibiting the possibility of only a signal or signals in the L−R track being reproduced.

14 Claims, 8 Drawing Sheets

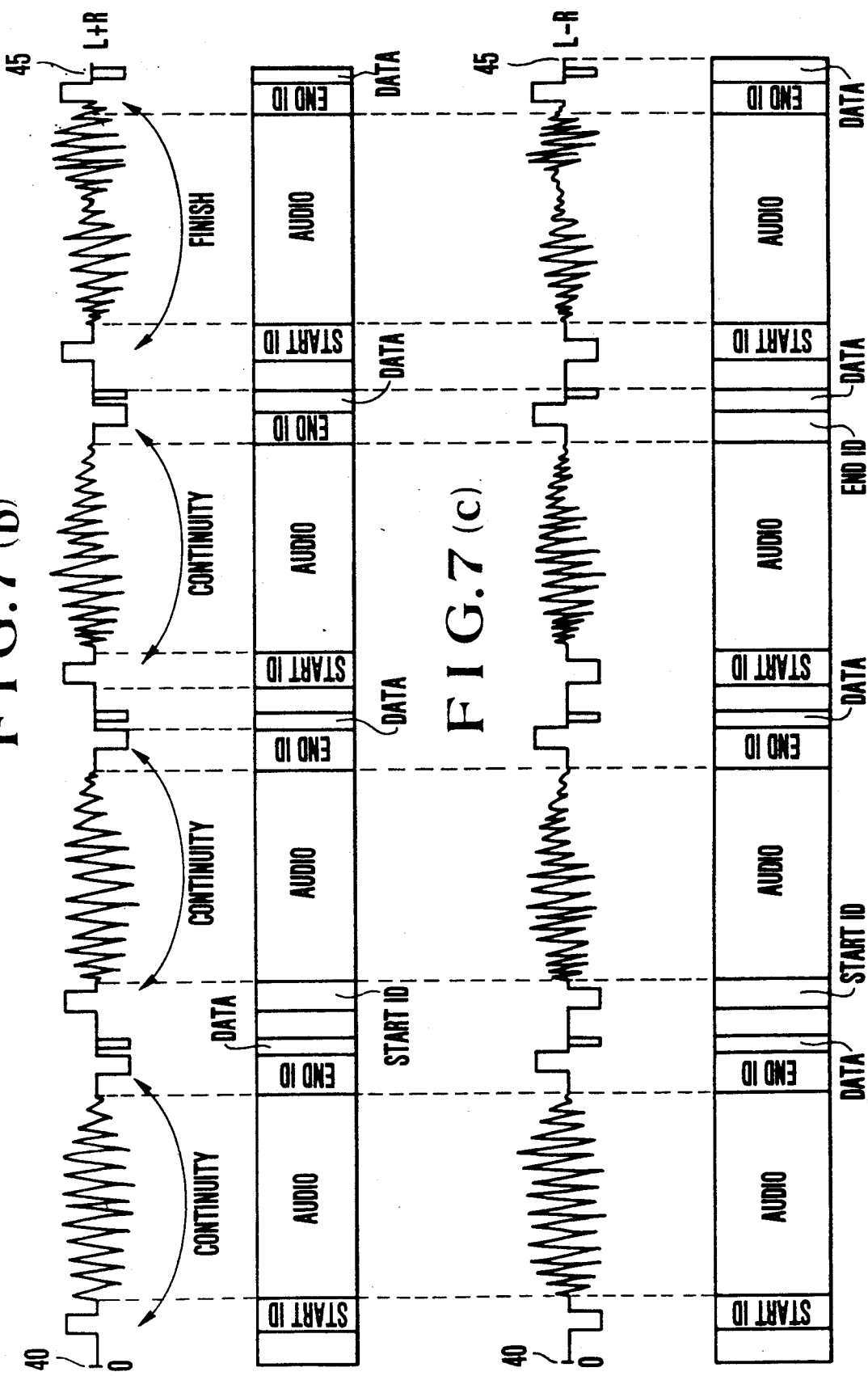

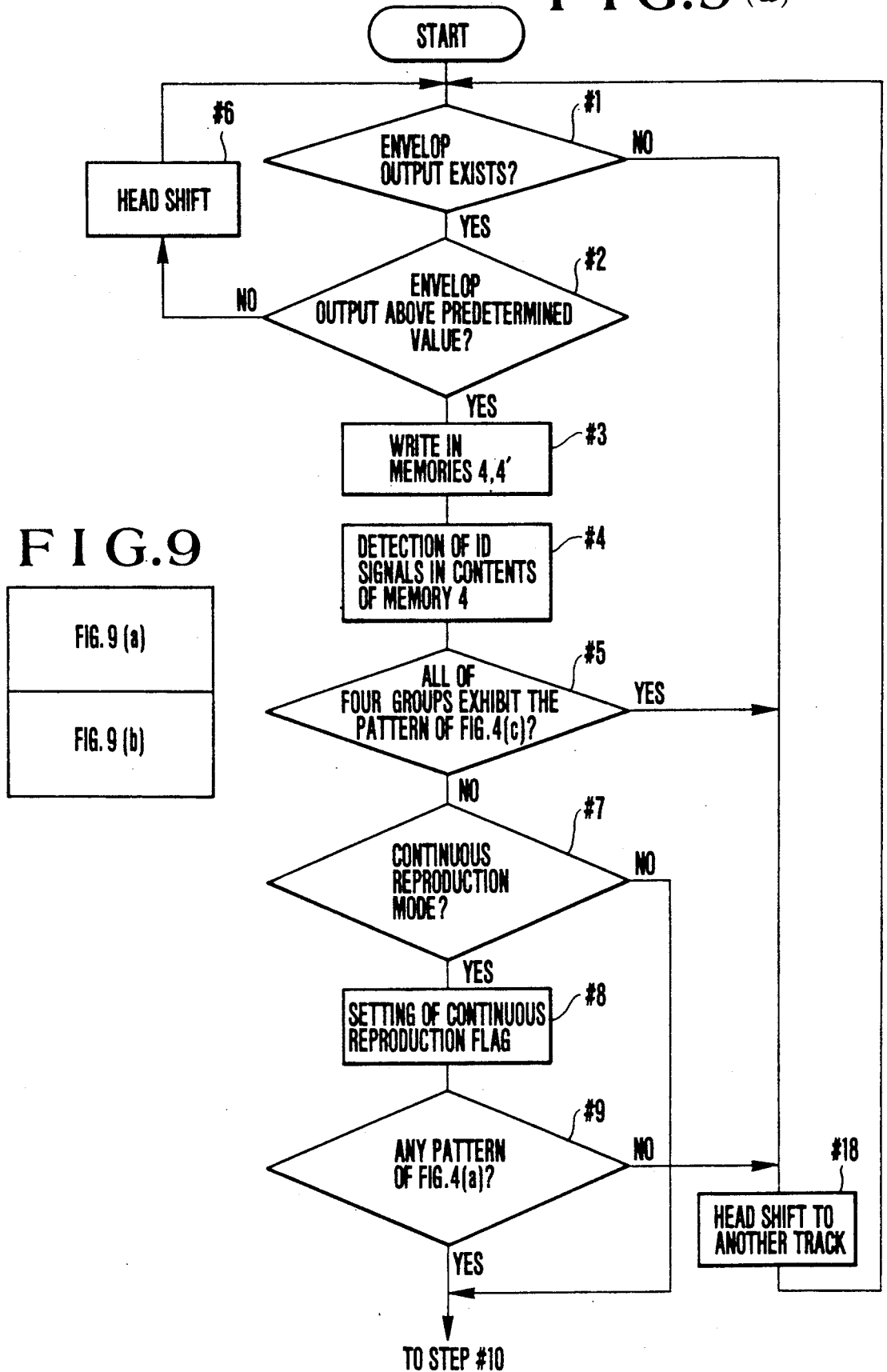

AUDIO SIGNAL RECORDING APPARATUS AND REPRODUCING APPARATUS

This application is a continuation of application Ser. No. 449,082, filed Dec. 8, 1989 now abandoned, which is a continuation of application Ser. No. 944,672, filed Dec. 18, 1986 now abandoned.

BACKGROUND OF THE INVENTION:

1. Field of the Invention:

This invention relates to a recording or reproducing apparatus and more particularly to a recording or reproducing apparatus capable of recording or reproducing audio signals.

2. Description of the Related Art:

Generally, audio signals can be recorded, along with video signals, on a recording medium such as a magnetic sheet for use in, e.g., still video systems.

The invention will be described below by way of an example of the format of a still video camera.

Fifty concentric tracks are formed on a magnetic sheet used in the still video camera exemplified, and this magnetic sheet is rotated about a rotational shaft at a speed of 60 cycles per second.

To effect audio signal recording in these tracks, an audio signal is compressed on the time base to be increased in the frequency and is thereafter frequency-modulated and recorded. An audio signal for a length of time of, for example, 10 to 20 seconds can be recorded in one track. The length thereof depends on the ratio of the compression on the time base.

However, it has only been possible to record or reproduce a monophonic sound by employing this recording or reproducing apparatus. It has not been possible to effect a recording and reproducing process with respect to an audio signal with, e.g., stereo signals which require two channels when recorded or reproduced.

Two tracks may be formed, one for an L+R signal and the other for an L−R signal (an R signal is an audio signal in a right channel, and an L signal is an audio signal in a left channel), to record stereo signals. When these signals are reproduced, the signals picked up from these tracks undergo addition and subtraction processes, thereby obtaining the R and L signals. However, this method entails a problem in that sometimes the signal from the track in which the L−R signal is recorded is the only one reproduced, instead of both of the signals recorded in the tracks in this manner being produced simultaneously.

SUMMARY OF THE INVENTION:

It is an object of the present invention to provide a recording apparatus which is free from the above-described problems.

It is another object of the present invention to provide a reproducing apparatus capable of reproducing, without errors, and with a constantly high level of performance, audio signals which have been recorded on a recording medium.

It is still another object of the present invention to provide a novel form of recorded audio signals in the audio signal recording and reproducing processes which are effected by employing a recording medium in the form of a disk.

It is a further object of the present invention to provide a reproducing apparatus capable of reproducing, with high performance and without errors, signals from a recording medium in which stereo and monophonic voices exist in a mixed state.

To this end, the present invention provides in one of its aspects a recording apparatus in which recording signal tracks such as an L+R voice track and an L−R voice track are recorded in a recording medium, the apparatus having controlling means for recording the L−R voice track with a discriminating signal which inhibits the possibility of only one track being reproduced.

In this apparatus, the L−R voice track can contain a discriminating signal for inhibiting the possibility of only one track being reproduced, thereby preventing the occurrence whereby this one track might be reproduced alone.

The present invention provides in another of its aspects a reproducing apparatus having judging means for recognizing a discriminating signal recorded in an L−R voice track, wherein the signal of the L−R track cannot be reproduced alone but is reproduced together with the signal of an L+R voice track when the L−R track is judged to contain such discriminating signal.

Other objects and features of the present invention will become clear upon reading the following descriptions of preferred embodiments of the present invention.

BRIEF DESCRIPTION OF THE DRAWINGS:

FIGS. 7(a), 7(b) and 7(c) are diagrams of the positions of items of data stored in the memories shown in FIG. 5;

FIGS. 9, 9(a) and 9(b) are a flowchart of the operation of a microcomputer shown in FIG. 8.

DETAILED DESCRIPTION OF THE PREFERRED EMBODIMENTS:

The present invention will be described in detail by way of examples of recording and reproducing apparatus which represent preferred embodiments of the present invention and in which two recording and reproducing heads are disposed tracing adjacent tracks.

In such apparatus, two adjacent tracks are traced at the same time when stereo recording and reproducing processes are effected.

The form of magnetic sheet with audio signals recorded thereon will be first described below before the description of the embodiments.

Figure 1:
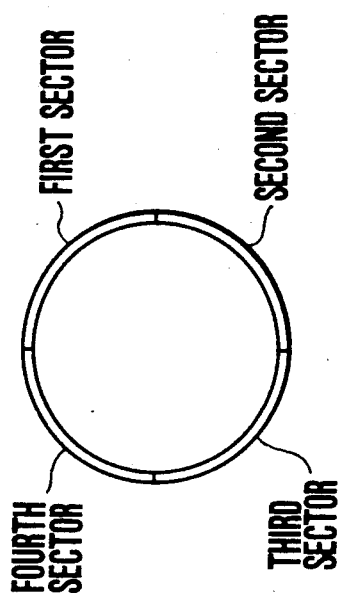
FIG. 1 is a plan view of a magnetic sheet employed in accordance with the present invention.

FIG. 1 shows in plan a magnetic sheet 12 which is inserted into a jacket (not shown) used in the embodiments. In FIG. 1, reference notes A1 and A2 denote concentric audio tracks formed on the magnetic sheet 12, and a reference note V denotes video tracks in which image signals are recorded.

The positions of the audio tracks and the video tracks are not previously determined, and audio or video information can be recorded optionally in any of these tracks.

An audio signal is compressed on the time base so that the frequency range of the signal is increased to the video range, and the signal is thereafter recorded in the frequency-modulated form.

An audio signal for a length of time of about 10 sec. can be recorded in one track if it is assumed that the audio signal range is under 5 kHz and the time base compression ratio is 640:1, and an audio signal of a length of time of 20 sec. can be recorded in one track if the audio signal range is under 2.5 kHz and the time base compression ratio is 1280:1.

Figure 2:
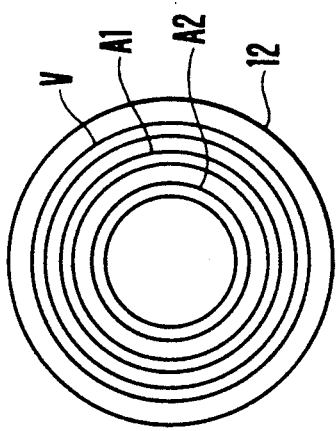
FIG. 2 is an illustration of a track formed on the magnetic sheet which is divided into four sectors.
Figure 3:
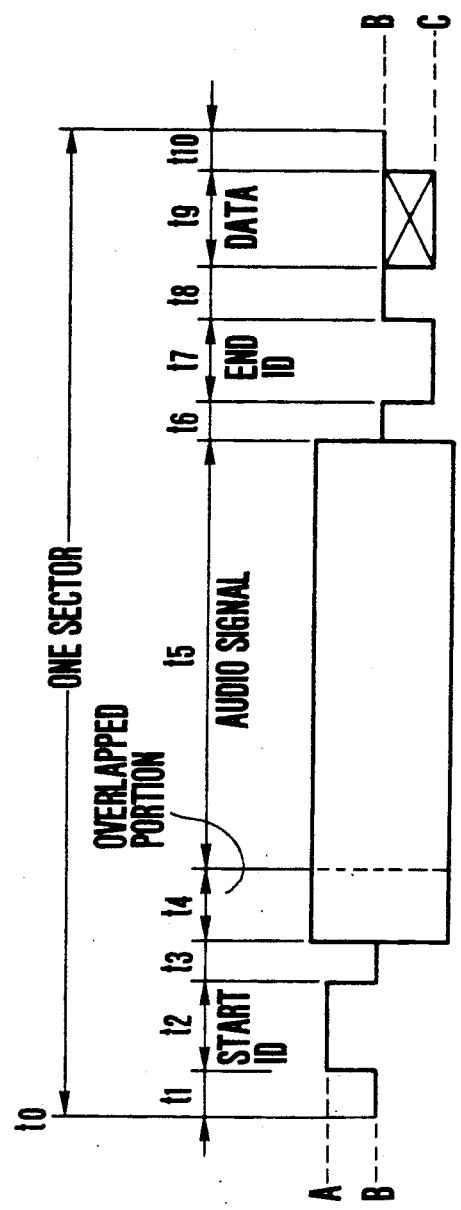
FIG. 3 is a diagram of a signal in time series read from one sector in which it has been recorded.

Each audio signal track is divided into four sectors, as shown in FIG. 2, and signals such as those shown in FIG. 3 are recorded in each sector. FIG. 3 shows signals on the time base, which have been frequency-demodulated from signals reproduced by the reproducing head when the magnetic sheet 12 shown in FIG. 1 is rotated. A start ID signal which indicates the time of reading the audio signal information and which issues after $t_1$ sec. has passed from the moment $t_0$ indicated at the left end in FIG. 3 continues for $t_2$ sec., and an audio signal which is recorded for a length of $t_4$ and $t_5$ follows the start ID signal with a blank period of $t_3$ interposed therebetween.

The first period of $t_4$ sec. defines the portion overlapping the preceding sector. Accordingly, the first sector does not have any overlapping portion of this kind, but the second sector and other sectors which follow do have this kind of overlapping portion. After the blank lasting $t_6$ seconds, an end ID signal for detecting the end of the audio signal exists for $t_7$ sec.

Then, after a blank period of $t_8$ sec., a period of data continues for $t_9$ sec., and another blank period of $t_{10}$ sec. follows thereafter, thus completing one sector.

In FIG. 3, the signal level relates to the frequency when the signal is frequency-modulated, and the level B—B indicates the center frequency with which this signal is frequency-modulated. The level A indicates the maximum frequency of the frequency-modulated signal, and the level C indicates the minimum frequency.

The significance of the start ID signal and the end ID signal will be described below with reference to FIGS. 4(a), 4(b) and 4(c).

Figure 4A:
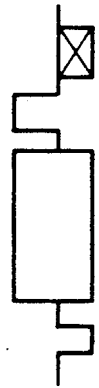
FIGS. 4(a), 4(b) and 4(c) are diagrams of combinations of start ID signals and end ID signals.

FIG. 4(a) shows that the information signal in this sector is succeeded by that recorded in the next sector if the start ID signal is at a high level and the end ID signal is at a low level, provided that these start and end ID signals are applied; FIG. 4(b) shows that this sector is the final one of the recorded sectors if the start ID signal is at a high level and the end ID signal is also at a high level, provided that these start and end ID signals are applied; and FIG. 4(c) shows that the sector is empty (there is no recording) if the start ID signal is at a low level while the end ID signal is at a high level, and again provided that these start and end ID signals are applied.

In the area for "DATA", various items of data on, e.g., the above-described time base compression ratio necessary for the reproduction are stored.

A recording apparatus which records audio signals in tracks in the above-described manner or a reproducing apparatus will now be described with reference to FIG. 5.

Figure 5:
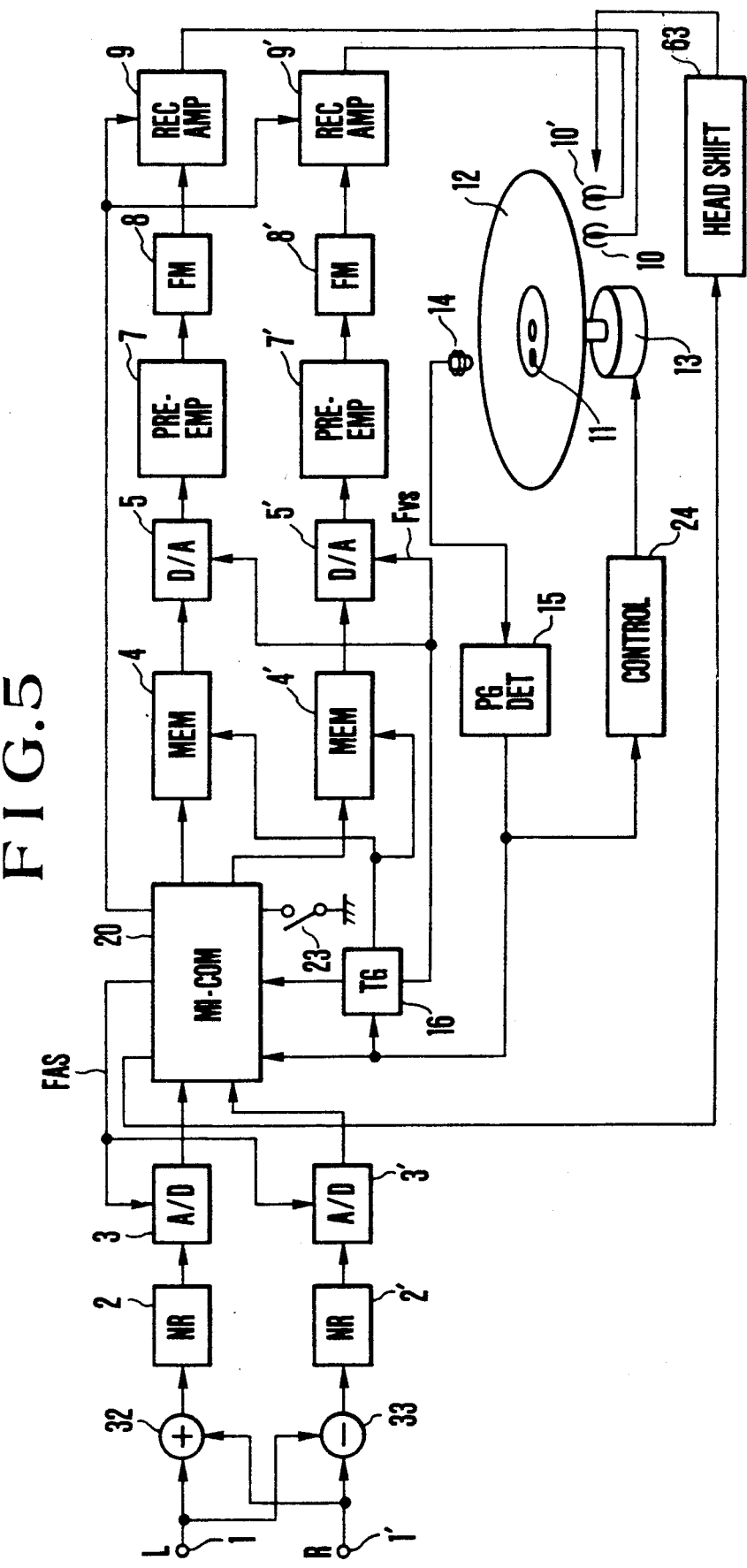
FIG. 5 is a block diagram of a first embodiment of the present invention.

FIG. 5 shows a block diagram of a recording or reproducing apparatus which represents an embodiment of the present invention. In FIG. 5, reference notes 1 and 1' denote terminals through which stereo audio signals are input, namely, a left channel (L) audio input terminal and a right channel (R) audio input terminal. A signal supplied through the left channel and a signal supplied through the right channel are hereinafter referred to as an L signal and an R signal. The apparatus has: an adder 32 for forming L+R signals; a subtracter 33 for forming L−R signals; noise reduction circuits 2 and 2'; A/D converters 3 and 3' for processing audio signals; a microcomputer 20; memories 4 and 4' for compressing the time base of audio signals; D/A converters 5 and 5' for the video signal range; pre-emphasis circuits 7 and 7'; frequency modulators 8 and 8'; and recording amplifiers 9 and 9'. In a pair of constituents having the same reference numerals, one of them without any prime "'" is a circuit element for processing L+R signals and the other with a prime "'" is a circuit element for processing L−R signals.

The center frequencies of the carriers in the frequency modulators 8 and 8' are equal to each other at the time of audio signal recording.

Figure 6:
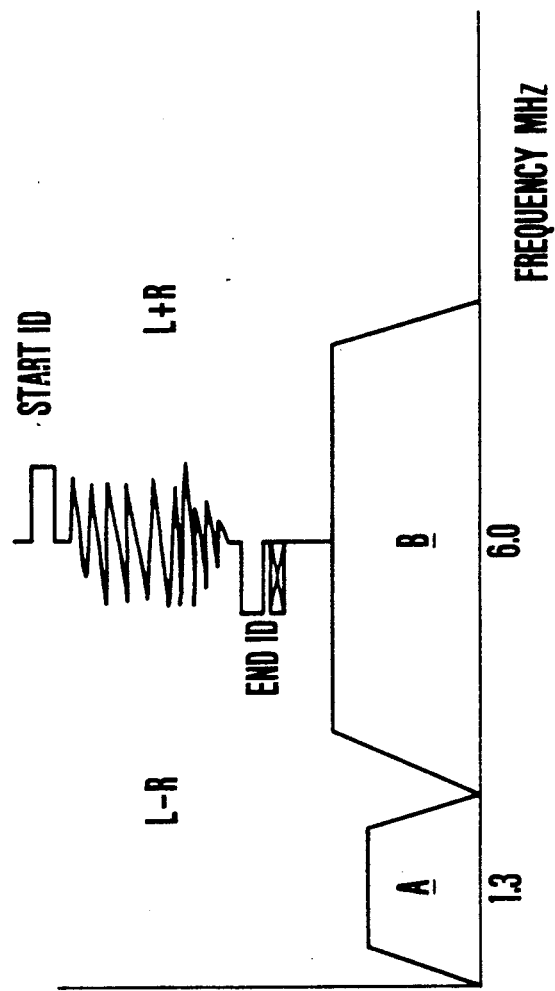
FIG. 6 is a diagram of the spectrum of a frequency-modulated signal recorded in a track.

In FIG. 6, the abscissa represents the frequency shift, and the ordinate represents the period of time. In the upper area of this drawing, the frequency shift of a frequency-modulated audio signal is shown. As shown in FIG. 6, the center frequency of the frequency modulators 8 and 8' is 6 MHz, and audio signals are recorded in a range within which luminance signals Y are recorded when video signals are recorded on the above-described magnetic sheets, namely, a range which corresponds to the area B indicated in FIG. 6.

The area A in FIG. 6 indicates the range within which line-sequential color-difference signals are recorded when video signals are recorded on the above-described magnetic sheet.

The apparatus also has; as shown in FIG. 5, a pair of two channel frame heads 10 and 10', namely, two channel inline heads; a PG pin 11 of the magnetic sheet 12; the magnetic sheet 12; a motor 13 for driving the magnetic sheet 12 to rotate; a detecting coil 14 of the rotational phase of the PG pin 11; a PG detection circuit 15 for detecting the rotational phase of the PG pin from the output of the coil 14; and a timing generating circuit 16 for driving the memories 4 and 4' and the D/A converters 5 and 5', which are described later, in accordance with PG signals detected by the PG detection circuit 15.

The microcomputer 20 thins out the audio signals which have been converted into digital signals by the A/D converter 3 and 3', thereby compressing the audio signals, and it transmits these signals to the memories 4 and 4' and drives the memories 4 and 4' and the A/D converters 3 and 3' in accordance with the output of the PG detection circuit 15. The apparatus is further provided with: a control circuit 24 for controlling the rotational speed of the motor 13 in accordance with the output of the PG detection circuit 15; a switch 23 which is operated by hand to change-over the mode of the recording such as monophonic or stereophonic recording; and a head shifting circuit 63 for shifting the positions of the heads 10 and 10' in response to the signals supplied from the microcomputer 20.

The operation of the embodiment thus arranged will now be described. The operation is first described with respect to the stereophonic recording mode set by means of the switch 23.

In this operation, the switch 23 is turned on and the microcomputer 20 controls the memories 4 and 4' such that items of information stored in these memories are both supplied to the pre-emphasis circuits 7 and 7'.

In this embodiment, L and R signals are independently input through the input terminals 1 and 1' to effect the stereophonic recording as described above.

An L+R signal formed by the adder 32 is supplied to the A/D converter 3 by way of the noise reduction circuit 2 and is converted, in the A/D converter, into a digital signal in accordance with a sampling signal FAS (A/D conversion clock pulses) supplied from the microcomputer 20. The frequency of the sampling signal supplied from the microcomputer 20 is changed on the basis of a predetermined compression ratio.

Figure 7A:
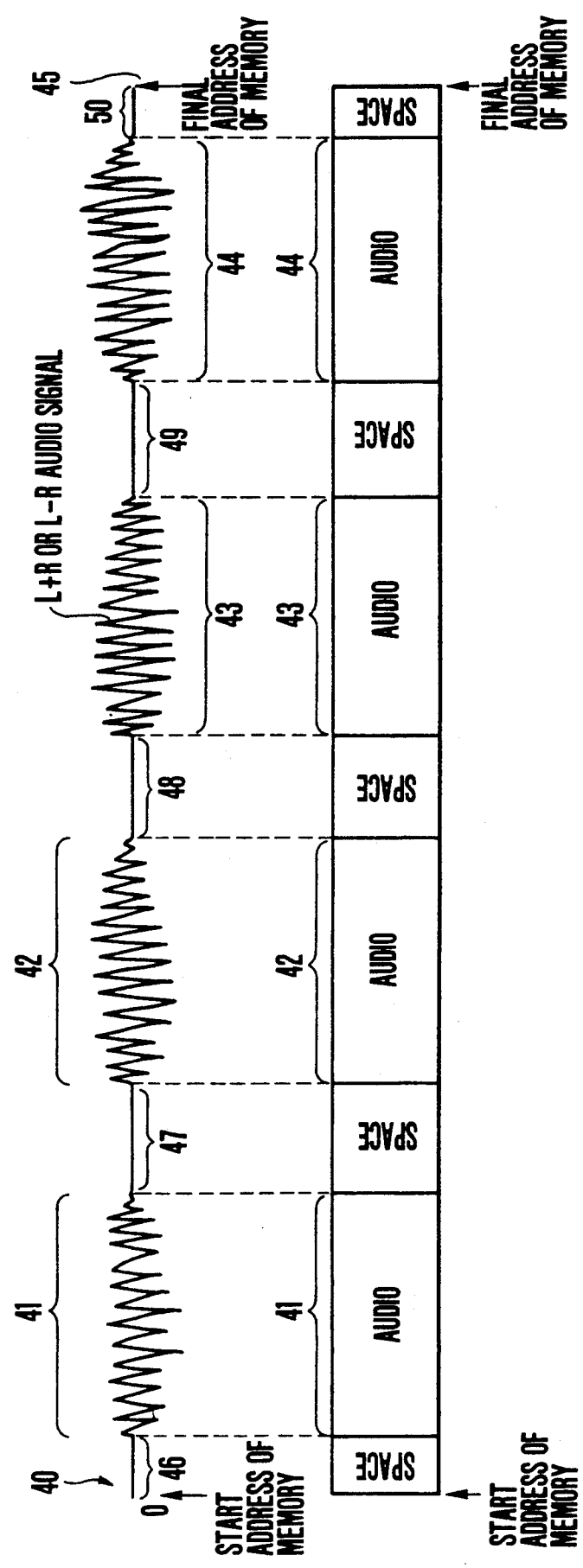

The A/D conversion process is thus effected by the A/D converters 3 and 3' in a synchronized relationship with the signal FAS supplied from the microcomputer 20 which designates the sampling frequency. The microcomputer 20 then memorizes the digital values output by the A/D converters 3 and 3' in the memories 4 and 4'. At this time, it writes the audio signal information into regions such as shown in FIGS. 7(a), 7(b) and 7(c). Digital signals which correspond to L+R and L−R signals are written into the memories 4 and 4'.

In FIGS. 7(a), 7(b) and 7(c), the abscissa represents the address in each of the memories 4 and 4', and a sort of data stored is indicated in each of the frames. As shown in FIG. 7(a), the items of digital data corresponding to the outputs of the A/D converters 3 and 3' are successively written into regions 41, 42, 43 and 44. There are some addresses in the memories 4 and 4' with which no data is written, and the data and the ID signals described above in conjunction with FIGS. 4(a), 4(b) and 4(c) are written in after the write process of the audio signal information has been completed.

While the items of data, which are stored in the certain regions of the memories 4 and 4' which have been previously left unwritten as blank spaces in the above-described manner, are successively read from the start address to the end address by a given clock, the recording can be effected on the disk on the basis of the standards shown in FIG. 3.

As described above, digital values corresponding to an L+R signal are memorized in the memory 4 while digital values corresponding to an L−R signal are memorized in the memory 4'. When the write processes of audio signals in the memories 4 and 4' are completed, the microcomputer fills, in accordance with the format, the predetermined regions designated as memory spaces: START ID; END ID; and DATA with the start ID signal, the end ID signal and the above-described data. That is, these signals and data are written into the memory 4 for L+R signals, as shown in FIG. 7(b). Incidentally, this data includes a signal which indicates the effected state of the stereo recording along with the data on the time base compression ratio. On the other hand, the start ID signal, the end ID signal and the data in accordance with the standards are written in the memory 4' for L−R signals, as shown in FIG. 7(c). The combination of these signals and data for L−R signals represents, at all sectors, the above-described unused state, as described above with reference to FIGS. 4(a), 4(b) and 4(c). A signal written in the data portion may be used to inhibit the possibility of only one track being reproduced.

When signal wave forms in accordance with the format are generated in the memories 4 and 4' after the write processes of the memories 4 and 4' of the microcomputer 20 have been completed, the microcomputer 20 supplies the recording amplifiers 9 and 9' with recording gate signals in response to the PG signal from the PG detection circuit 15, for a period of time corresponding to that is taken for the magnetic sheet to make one revolution. Then, recording currents for one revolution which correspond to the contents in the memories 4 and 4' simultaneously flow into the heads 10 and 10', thereby effecting recording in adjacent tracks. More in detail, the memories 4 and 4' are continuously driven in synchronized relationship with the PG signal, and, therefore, the D/A converters 5 and 5' are constantly supplied with items of data which correspond to the signal wave forms shown in FIGS. 7(b) and 7(c), and the same wave forms as those shown in FIG. 7 are output by the D/A converters 5 an 5'. The outputs of the D/A converters 5 and 5' are supplied to the frequency modulation circuits 8 and 8' by way of the pre-emphasis circuits 7 and 7', thereby being frequency-modulated, and they are thereafter supplied to the recording amplifiers 9 and 9'. The contents of the memories 4 and 4' are repeatedly read out in a synchronized relationship with the PG signal of the magnetic disk 12. In this embodiment, the recording of these items of data for one track is effected with respect to both L+R and L−R signals at the same time while the gate is open for a period of time taken for one revolution of the disk.

In this embodiment, as described above, an L+R signal and an L−R signal are formed from an R signal of the R channel and an L signal of the L channel and they are recorded in separate tracks while a signal which indicates the empty state of the track is recorded together with the L−R signal. Accordingly, an ordinary reproducing apparatus which does not have the function of reproducing stereo signals reproduces only signals recorded in the track for L+R signals and does not reproduce L−R signals in the reproducing process. It is possible to prevent the possibility of L−R signals being reproduced by the reproducing apparatus and heard as a strange sound by the user. In contrast, a reproducing apparatus having the function of reproducing stereo signals reads the track written with L−R signals while synchronizing this read with that of the track written with L+R signals on the basis of the signals which are written in the data portion in each sector in which L+R signals are recorded. Thus, it effects the stereo reproduction.

In short, in this embodiment, the monophonic reproduction of L+R signals can be effected by the function of conventional reproducing while preventing any error in operation that may result in the reproduction of only L−R signals.

Another embodiment of the present invention which enables the stereo reproduction by simultaneously reading a track written with L+R signals and a track written with L−R signals will be described below with reference to FIG. 8.

Figure 8:
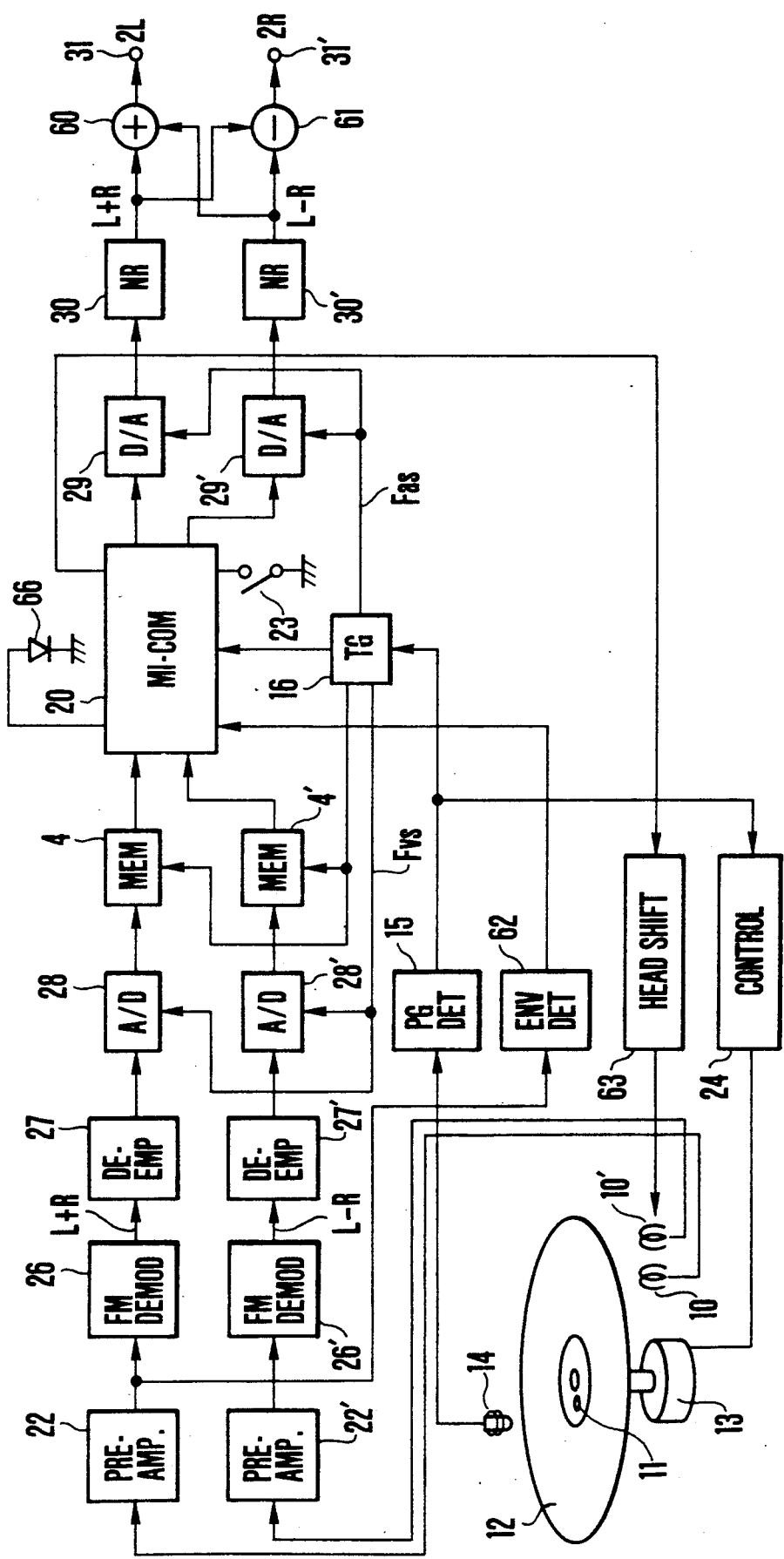
FIG. 8 is a block diagram of a second embodiment of the present invention.

FIG. 8 is a block diagram of a reproducing apparatus which represents this embodiment. Blocks in FIG. 8 which represent the same functions as those of the blocks shown in FIG. 5 are given the same numerals and the descriptions for them will not be repeated. The apparatus shown in FIG. 8 has: reproducing pre-amplifiers 22 and 22'; frequency-modulation demodulators 26 and 26'; deemphasis circuits 27 and 27'; A/D converters 28 and 28' the conversion ranges of which include the video signal range shown in FIG. 6; and D/A converters 29 and 29' for converting audio signals in the digital form read from the memories 4 and 4' into analog signals. The conversion range of each of these D/A converters 29 and 29' is within the audio signal range and is at most not higher than 20 kHz. The apparatus further includes: noise reduction circuits 30 and 30' which have the characteristics reverse to those of the noise reduction circuits 2 and 2' shown in FIG. 5; an adder 60 and a subtracter 61 for reproducing an L signal and an R signal form L+R and L−R signals; an envelope detection circuit 62 which detects the envelope of the output of the pre-amplifier 22 and supplies a signal to the microcomputer 20 when a detected envelope exceeds a predetermined value; and an LED 66 which is a display means for warning that the stereo reproduction cannot be effected when signals in the track in which a monophonic voice has been recorded is reproduced in the stereo reproduction mode.

The frequencies of pulses Fvs and Fas generated by the timing genarating circuit 16 assume the following relationship: Fvs=NFas (N: compression ratio).

The function of the embodiment thus arranged will be described below. Audio signals are recorded on the magnetic sheet 12. When the stereo voice reproduction mode is selected by the operation of the switch 23, the heads 10 and 10' are first shifted to the positions on the tracks. Signals read by the heads 10 and 10' are supplied to the deemphasis circuit 27 and 27 via the pre-amplifiers 22 and 22' and the FM demodulators 26 and 26', and the outputs of the deemphasis circuits 27 and 27' are supplied to the A/D converters 28 and 28' and are both memorized in the memories 4 and 4'. Signals corresponding to the audio signals memorized in the memories 4 and 4' are read out on the basis of a predetermined timing, thereby effecting the time-base expansion. The microcomputer 20 thus controls this process to reproduce the stereo voice signals.

Figure 9B:
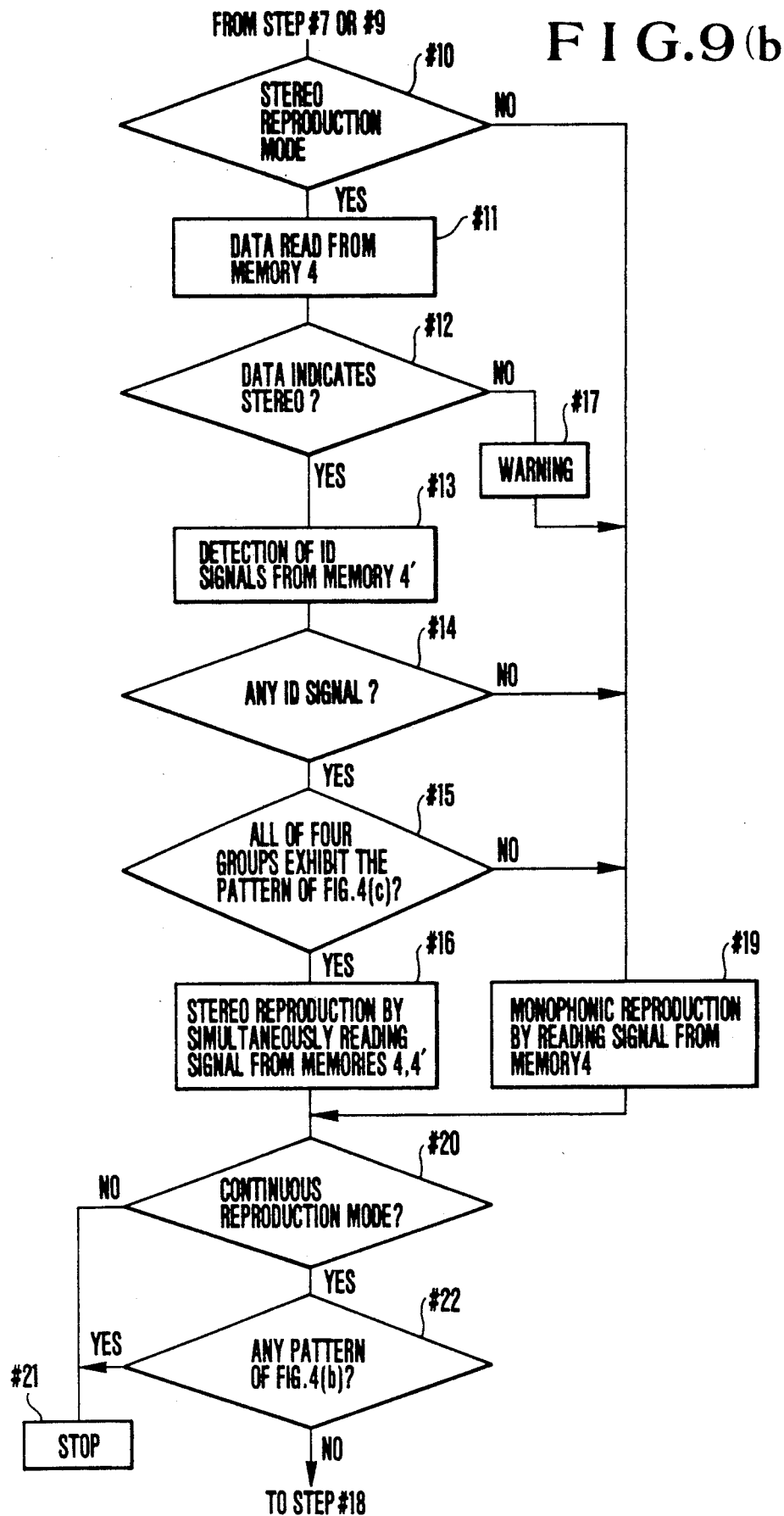

This operation of the microcomputer 20 will be described with reference to the flowchart shown in FIG. 9.

Step #1

In the voice reproduction mode, the output of the envelope detection circuit 62 is first detected, thereby judging whether or not the present track is a used track. If in this step the envelope output is obtained, the process proceeds to Step #2. If it is not obtained, the process proceeds to Step #18.

Step #2

The judgment is made as to whether or not the output of the envelope detection circuit 62 detected in Step #1 exceeds a predetermined value, in other words, whether or not the head 10 is in a predetermined position on the track. If the output is less than the predetermined value, the process proceeds to Step #6 and the head is finely adjusted by being moved by an amount smaller than the width of one track. If the output is not less than the predetermined value, the process proceeds to Step #3.

Step #3

Reproduced signals are written in the memories 4 and 4'. In this step, A/D converters 28 and 28' operate such that data is recorded only while the magnetic sheet 12 rotates in response to the PG signal detected by the PG detection circuit 15.

Step #4

Only the regions of the memory 4 in which ID signals are written are read to detect the ID signals.

Step #5

Step The four patterns of the ID signals detected in Step #4 are judged. If all of the four combinations of start ID signals and end ID signals are the same as that shown in FIG. 4(c), the present track contains no audio signal or contains L−R signals recorded in the manner of stereo voice recording described above. Then the process proceeds to Step #18.

Step #6

This step is effected when the envelope output is obtained in Step #2 and when the envelope output is less than the predetermined value. In this Step, the heads 10 and 10' are moved by a minute amount for the fine adjustment.

Step #7

Figure 4B:
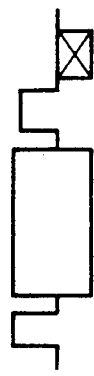
Figure 4C:

If, in Step #5, the pattern shown in FIG. 4(c) is detected, the judgment is made in this step as to whether or not the present mode is a continuous reproduction mode. The continuous reproduction mode means the process of successively reading a voice track in which audio signals are continuously recorded. If the continuous reproduction mode has not been selected, the process proceeds to Step #10.

Step #8

In the continuous reproduction mode, a continuous reproduction flag is set.

Step #9

In this Step, a head sector of the continuous voice track is found in the continuous reproduction mode by detecting the combination of start ID and end ID signals which is shown in FIG. 4(a). That is, if in this step the head sector is not found, the process proceeds to Step #18, and the head is shifted to another track. Then the process proceeds to Step #1, thereby repeating the loop including Steps #1 to #9 and Step #18 until a head sector is found. When a head sector is found, the process proceeds to Step #10.

Step #10

In this step, the judgment is made as to whether or not the present mode is a stereo reproduction mode, by discriminating the state of the switch 23. If it is a stereo reproduction mode, the process proceeds to Step #11. If it is not the stereo reproduction mode but a monophonic reproduction mode, the process proceeds to Step #19.

Step #11

If the stereo reproduction mode has been selected, information recorded on the magnetic sheet 12 is judged as to whether or not it can be used as stereo information, by reading the data which is recorded in positions adjacent to those of the ID signals.

Step #12

The judgment is made as to whether or not the data which has been read in Step #11 informs that the tracks have stereo voice record. If Yes, the process proceeds to Step #13. If No, the process proceeds to Step #17, and the LED 66 is lighted, thereby warning that the tracks do not include any stereo record. The process thereafter proceeds to Step #19 to effect monophonic reproduction.

Step #13

Signals are read from the regions of the memory 4' which memorized the output of the head 10' and in which ID signals are recorded.

Step #14

The judgment is made as to whether or not the signals which have been detected in Step #13 exhibit one of the patterns of ID signals. If they do not exhibit any of the patterns of ID signals, in other words, there is no ID signal, the process proceeds to Step #19, since the absence of ID signals means that one of the stereo voice channels is blank.

Step #15

The judgment is made as to whether or not all of the patterns of ID signals in the sectors which have been detected in Step #14 correspond to that shown in FIG. 4(c). If there are L−R signals of the stereo voices recorded, the signals in each sector exhibit the same pattern as shown in FIG. 4(c). Accordingly, if these patterns are detected, the process proceeds to Step #16, thereby effecting the stereo reproduction. If they are not detected, the present tracks are irrelevant to this stereo reproduction, so that the process proceeds to Step #19. That is, if one of the tracks in which stereo voices was recorded has been blanked and thereafter written with irrelevant audio signals, the process proceeds from Step #15 to Step #19, thereby inhibiting the stereo reproduction.

Step #16

The stereo reproduction is effected by reading out audio signals from the memories 4 and 4' at the same time.

Step #19

The monophonic reproduction is effected by reading out audio signals from the memory 4.

It goes without saying that, while audio signals are being read from the memory, ID signals and Data portions are also read.

Step #20

If the continuous reproduction flag for judging whether or not the continuous reproduction mode has been selected has been set, the process proceeds to Step #22. If the continuous reproduction flag has not been set, the process proceeds to Step #21, since the operation is not in the continuous reproduction mode.

Step #21

In this step, the continuous reproduction is stopped, and, hence, head traveling is stopped.

Step #22

If there are ID signals, which exhibit the same combination as that shown in FIG. 4(b), in the sectors of the tracks from which signals are reproduced, the process proceeds to Step #21 in order to finish the reproducing operation, since there is no succeeding voice record in any other tracks. If there is not any combination of ID signals same as that shown in FIG. 4(b), the process skips to Step #18, and the heads 10 and 10' are shifted to another track. The steps starting from Step 31 are thereafter repeated, thereby continuously performing voice reproduction.

As described above, the microcomputer 20 performs the operation in the stereo reproduction mode with respect to the tracks in which stereo voices are recorded. When it operates in the monophonic reproduction mode, the process skips from Step #10 to Step #19, and only the information recorded in the memory 4, namely, the information corresponding to L+R signals is read out, thus effecting the monophonic reproduction.

If the stereo reproduction mode has been set at the time of monophonic voice reproduction from the track in which a monophonic voice is recorded, the process skips from Step #12 to Step #17. Then, a display which warns that stereo reproduction is not allowed is made and signals are read from the memory 4, thus effecting the monophonic reproduction.

If one of the pair of tracks in which stereo voices are recorded and from which the stereo voices are reproduced at the time of stereo reproduction is blanked and/or if irrelevant voices are thereafter recorded on the blanked track, the process skips from Step #14 or #15 to Step #19, thereby automatically performing monophonic reproduction, thus preventing malfunctions.

When a sound reproduction is performed by reading signals from the memories 4 and 4', the microcomputer 20 operates to read out audio data while setting the respective addresses of the memories 4 and 4' so that audio signals are reproduced from the memories 4 and 4' at a speed according to the compression ratio of audio signal included in the DATA written immediately after the end ID signal. The read out signals are supplied to the D/A converters 29 and 29' to be converted into analog signals. Thus-obtained audio signals are supplied to the noise reduction circuits 30 and 30' to be subjected to a noise reduction processing and, then, are reproduced.

As described above, in the arrangement of a recording apparatus in accordance with the present invention whereby signals of L+R and L−R voice tracks are recorded on a recording medium, discriminating signals for inhibiting the L−R voice track from being read alone in the reproduction process are added to the L−R voice track, thereby ensuring a perfect compatibility with ordinary monophonic reproducing apparatus.

What is claimed is:

1. An audio signal recording comprising:
   (a) first means for generating an L+R signal, wherein said L represents a left channel audio signal and said R represents a right channel audio signal;
   (b) second means for generating an L−R or R−L signal;
   (c) recording means for recording said L+R signal and said L−R or R−L signal, said recording means recording, with said L−R or R−L signal, a control signal for inhibiting the possibility of only said L−R or R−L signal being reproduced, wherein said recording means is operative to record said L+R signal and said L−R or R−L signal on different areas of a recording medium and said control signal is combinedly used as a signal which indicates that no audio signal is recorded and wherein said L+R signal and said L−R or R−L signal are those compressed on a time axis and these signals are recorded by said recorded means in time series with said control signal, and wherein said control signal is also used as a start signal for indicating the area where said audio signal is recorded.

2. An audio signal recording apparatus according to claim 1, wherein said control signal is recorded time-divisionally with said L−R or R−L signal.

3. An audio signal recording apparatus according to claim 1, wherein said recording means includes:
   (a) a recording head; and
   (b) means for modulating said L+R signal and said L−R or R−L signal and for supplying said head with such modulated signals.

4. An audio signal reproducing apparatus for reproducing an audio signal from a recording medium in which and L+R signal and an L−R or R−L signal are recorded on different areas of said recording medium, together with a reproduce controlling signal, comprising:
   (a) reproducing means for reproducing said audio signal and said reproduce controlling signal recorded on the medium;
   (b) discriminating means for discriminating a reproduce state represented by said reproduce controlling signal; and
   (c) control means for controlling said reproducing means so that a single reproduction of said L−R or R−L signal is not effected when such result of discrimination is given by said discriminating means that said reproduce controlling signal indicates inhibition of the single reproduction of the L−R or R−L signal, wherein said reproduce controlling signal is in a first state where it indicates that the audio signal is recorded or in a second state where it indicates that no audio signal is recorded, and the R−L or L−R signal is applied with the reproduce controlling signal when it is in said second state and wherein said L+R signal and said L−R or R−L signal are those compressed on a time axis and they are reproduced by said reproducing means in time series with said reproduce controlling signal, and wherein said controlling signal is also used as a start signal for indicating the area where said audio signal is recorded.

5. An apparatus according to claim 4, wherein said medium is disk-shaped.

6. An apparatus according to claim 5, wherein said audio signal is recorded on said medium after being modulated, and wherein said reproducing means includes:
   (a) means for demodulating said audio signal recorded on said medium.

7. An audio signal recording apparatus comprising:
   (a) first means for generating an L+R signal, wherein said L represents a left channel audio signal and said R represents a right channel audio signal;
   (b) second means for generating an L−R or R−L signal;
   (c) recording means for recording said L+R signal and said L−R or R−L signal, said recording means recording, with said L−R or R−L signal a control signal for inhibiting the possibility of only said L−R or R−L signal being reproduced wherein said recording means is operative to record said L+R signal and said L−R or R−L signal on different areas of a recording medium and said control signal is combinedly used as a signal which indicates that no audio signal is recorded and wherein said L+R signal and said L−R or R−L signal are those compressed on a time axis and these signals are recorded by said recording means in time series with said control signal, and wherein said control signal is also used as a start signal for indicating the area where said audio signal is recorded;
   (d) means for reproducing said audio signal and said control signal recorded on the medium;
   (e) means for discriminating whether or not said control signal represents the inhibition of the possibility of only said audio signal being reproduced; and
   (f) means for controlling said reproducing means in accordance with the result of such discrimination by said discriminating means.

8. An audio signal recording and reproducing system according to claim 7, wherein said medium is a disc-shaped medium.

9. An audio signal recording and reproducing system according to claim 7, wherein said recording means includes means for modulating said L+R signal and L−R or R−L signal, and wherein said reproducing means includes means for demodulating said L+R signal and L−R signal modulcated by said modulating means.

10. An audio signal recording and reproducing system according to claim 7, wherein said L−R or R−L signal and L+R signal are recorded on said recording medium at different positions.

11. A recording apparatus comprising:
   (a) R−L or L−R signal generating means for generating R−L or L−signal;
   (b) R+L signal generating means for generating R+L signal;
   (c) means for compressing said R−L or L−R signal and R+L signal on a time axis; and
   (d) means for adding a control signal for inhibiting the possibility of only said L−R or R−L signal being reproduced to said R−L or L−signal compressed by said compressing means and for recording said signals thereafter, and wherein said control signal is also used as a start signal for indicating the area where an audio signal is recorded.

12. An apparatus according to claim 11, wherein said compressing means includes a memory for storing said R−L or L−R signal and R+L signal.

13. An apparatus according to claim 11, wherein said adding means is arranged to add said control signal to said R−L or L−R signal in time series.

14. An apparatus according to claim 11, wherein said control signal consists of a combination of polarities of a start ID signal and an end ID signal added to said L−R or R−L signal.

* * * * *

UNITED STATES PATENT AND TRADEMARK OFFICE
CERTIFICATE OF CORRECTION

PATENT NO. : 5,018,028

DATED : May 21, 1991

INVENTOR(S) : Tsuguhide Sakata et al.

It is certified that error appears in the above-identified patent and that said Letters Patent is hereby corrected as shown below:

```
Col. 7,  line 22.  Change "genarating" to -- generating --
Col. 8,  line 7.   Delete "Step"
Col. 8,  line 18.  Change "Step" to -- step --
Col. 8,  line 37.  Change "Step" to -- step --
Col. 12, line 32.  Change "modulcated" to -- modulated --
Col. 12, line 40.  Change "L-signal" to -- L-R signal --
Col. 12, line 47.  Change "L-signal" to -- L-R signal --
```

Signed and Sealed this

Twenty-seventh Day of October, 1992

Attest:

DOUGLAS B. COMER

*Attesting Officer*    *Acting Commissioner of Patents and Trademarks*